Sept. 1, 1953 J. R. TURNER 2,650,556
DEVICE FOR DISTRIBUTING MIXTURES OF VAPORS AND LIQUID
Filed June 28, 1948 3 Sheets-Sheet 1

Inventor: James R. Turner
By Oswald H. Milmore
His Attorney

Sept. 1, 1953  J. R. TURNER  2,650,556
DEVICE FOR DISTRIBUTING MIXTURES OF VAPORS AND LIQUID
Filed June 28, 1948  3 Sheets-Sheet 3

Inventor: James R. Turner
By Oswald H. Milmore
His Attorney

Patented Sept. 1, 1953

2,650,556

UNITED STATES PATENT OFFICE 2,650,556

DEVICE FOR DISTRIBUTING MIXTURES OF VAPORS AND LIQUID

James R. Turner, Concord, Calif., assignor to Shell Development Company, San Francisco, Calif., a corporation of Delaware Application June 28, 1948, Serial No. 35,658

9 Claims. (Cl. 111—7)

1

The invention relates to a device for distributing mixtures of vapor and liquid among several outlets, and is more particularly concerned with distribution of such fluid mixtures on moving or unsteady supports, e. g., on vehicles. While not limited thereto, the invention is especially adapted to distribute a mixture of liquid and gaseous anhydrous ammonia among several shanks in an applicator mounted on a farm tractor, trailer, or other vehicle used for injecting ammonia into the ground.

In ammonia injection for agricultural purposes, substantially liquid, anhydrous ammonia is withdrawn from a pressure vessel through a metering device, and passed to a manifold or distributor from which individual streams are flowed through separate pipes or hose to the several injecting devices, e. g., plow blades, cultivator chisels or harrowing elements provided with hollow bores or with attached tubes for discharging the ammonia beneath the ground. Varying amounts of the liquid ammonia are vaporized either within the storage vessel and/or in the metering device and distributor due to the lowering of the pressure incident to flow therethrough. Great difficulty has been experienced in obtaining even distribution of ammonia among the several injectors, because the liquid ammonia collects at the extremities of an ordinary elongated manifold or distributor, with the result that the outlets therefrom which are at the extremities receive mostly liquid ammonia, and the outlets nearest the manifold inlet receive mostly vapors. This effect is experienced even when the manifold tube is horizontal, and may be due to the momentum of the liquid ammonia in flowing toward the ends of the tube. The liquid being much denser than the vapors, the injecting devices supplied by the farthest outlets receive a disproportionately large weight rate of flow of ammonia at the expense of the intermediate injecting devices, which are supplied predominantly with vapors. Also, it is not practicable to maintain all of the outlets from the manifold or distributor at the same elevation on tractors and the like due to the movement thereof and the nature of the terrain traversed, and the movement and jarring of the manifold aggravates uneven distribution of ammonia.

It is already known in stationary heating and refrigeration arts to distribute gases and liquids among several outlets by means of feed distributing heads which produce a mixture of gas and vapor by whirling and the like. Most of such devices are not, however, readily adapted for use of vehicles used for agricultural purposes, because

2 they operate at best efficiencies only when used on steady supports wherein the relative elevations of the outlets are not altered, and because even distribution of fluid mixture among the several outlets is not always attained when some of the outlets are plugged. In agricultural work, however, particularly in the injection of ammonia, the distributors are subjected to jarring and changes in inclination, and a varying number of outlets must be supplied by one distributor in different instances. In the injection of ammonia, moreover, the rate of flow of ammonia varies greatly on different applications with the same equipment and is frequently turned off, as when the vehicle turns about at the end of a field. Whirl type distributors do not instantaneously effect even distribution if subjected to jarring. It is, however, desirable that the distributor effect an even distribution of ammonia to the several outlets promptly after the flow of ammonia is begun.

It is, therefore, an object of the invention to improve the distribution of a mixture of vapor and liquid, and particularly of ammonia vapor and liquid, on a vehicular mount among several outlet streams, the number of which will vary from time to time. A further object is to provide an improved distribution system which is simple to build, and which will distribute ammonia substantially evenly to a plurality of injectors notwithstanding vibrations and/or changes in inclination of a vehicle on which it is mounted, and which will be effective notwithstanding intermittent operation of the system; and which will distribute the liquid-vapor mixture substantially equally no matter how many outlets are used or what the rate of flow is.

Briefly, according to the invention, the mixture of vapor and liquid, e. g., a metered stream of partially vaporized anhydrous ammonia, is flowed generally downwardly under pressure and at a velocity to create turbulence, into a pocket or confined space, and is withdrawn laterally in a plurality of separate streams through somewhat smaller outlets, either horizontal or upwardly inclined, and communicating with the space beneath the top of the pocket, i. e., at the bottom or a small distance above it. As a result of such flow, involving a reversal of direction which produces a turbulence sufficient to keep the vapor and liquid in a more or less homogenous mixture, substantially uniform distribution of the mixture among the several outlets is achieved, notwithstanding moderate changes in the inclinations of the several streams, or a wide variation in the number of outlets used on a particular application.

The invention will be better understood by reference to the accompanying drawing forming a part of this specification and illustrating certain preferred embodiments of the invention, wherein.

Figure 1:
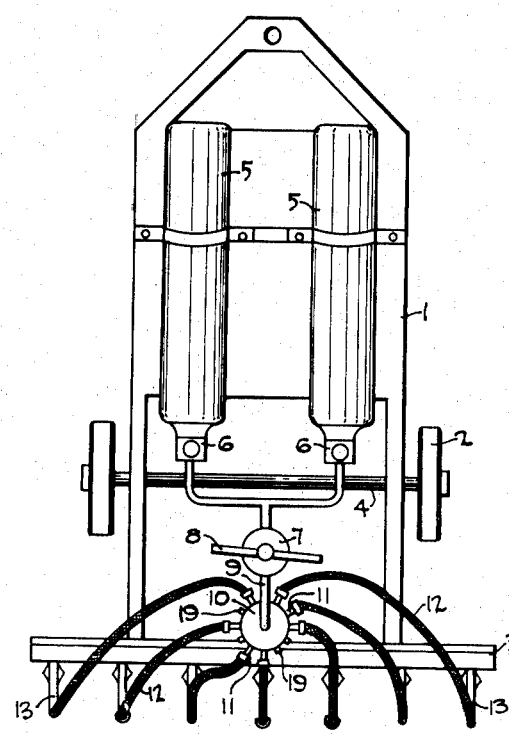
Fig. 1 is a plan view of a trailer equipped with an ammonia injection system according to the invention.

Referring to the drawing in detail, 1 represents a trailer having wheels 2 and suitable mechanism (not shown) for changing the elevation of the frame and its tool bar 3 with respect to the wheel axle 4. The trailer carries one or more storage cylinders 5, containing liquid, anhydrous ammonia, each cylinder having a cock 6 and being connected to a metering device and flow control device 7 having a lever valve actuated by lever 8. The controller delivers a metered mixture of ammonia vapors and liquid through main supply line 9. The pipe 9 is screwed into the distributing head 10, from which a plurality, e. g., four to twelve outlet pipes 11 are supplied with ammonia vapors and liquid. The outlet pipes 11 are connected by flexible hose sections 12 to injection blades or shanks 13 which are clamped to the tool bar 3 and are adapted to inject ammonia beneath the surface of the ground during movement of the vehicle 1.

Figure 2:
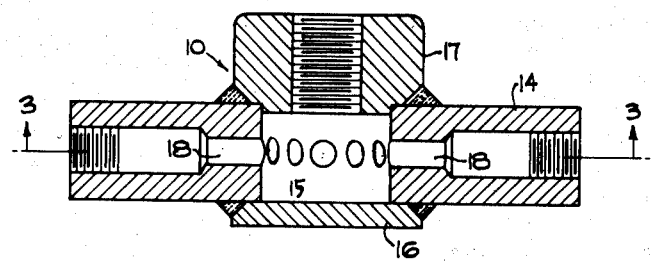
Fig. 2 is a vertical cross sectional view of the distributing head taken on line 2—2 of Fig. 3.
Figure 3:
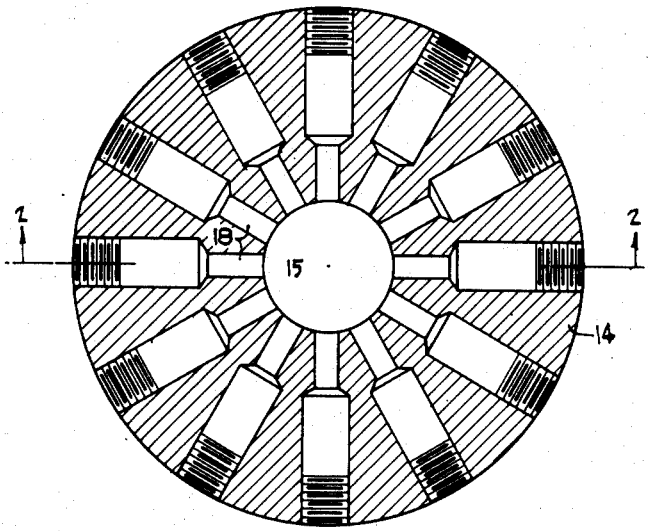
Fig. 3 is a horizontal section plan view on line 3—3 of Fig. 2.

The distributor head 10, shown more particularly in Figs. 2 and 3, is formed of a circular plate 14 with a central hole 15 at the center, forming a pocket or turbulence chamber. The bottom of the pocket is closed by a cover disc 16 welded to plate 14, and internally threaded bushing 17 is welded to the top to permit connection to the supply pipe 9. The head is mounted on the vehicle 1 to have its main bore 15 vertical when the vehicle is on level ground. The plate 14 has twelve small diameter, lateral outlet passages 18 evenly spaced circumferentially. The outer ends of the outlet passages 18 are countersunk and tapped to provide a threaded connection for the outlet pipes 11. Plugs 19 are fitted into the passages not used as outlets.

In operation, the vapor and liquid from the cylinders 5 flow at a desired rate of flow through the metering device 7 and supply pipe 9 downwardly into the distributing head 10. The feed mixture is maintained in a state of turbulence in the chamber 15 and discharged through the passages 18 at a moderately high velocity, causing liquid to be entrained by the vapors. Because the passages 18 have their intakes at an intermediate level of the chamber 15, well below the top of the turbulent mixture, all will be supplied with a mixture of about the same composition, regardless of movement of the head away from its vertical position within reasonable limits, such as would result from movement of the vehicle 1 over sloping or uneven terrain. After leaving the distributor head, the mixture moves to the injection blades through outlet tubes 11. Since the design of the manifold insures equal distribution to the tubes, they may be made large enough to handle the largest design flows without excessive pressure drop and still maintain equal distribution when small flows are used.

It was found that by arranging the conduits in the manner illustrated in the drawings substantially even distribution of ammonia to the several shanks of the ammonia applicator could be attained, such equality of distribution being usually indicated with sufficient accuracy by noting the equal degree of frosting on the various hose connections 12. With this arrangement there is an appreciable pressure drop within the chamber 15 due to turbulence, causing some vaporization of liquid ammonia. This insures a flow velocity through the radial outlets 18 sufficient to entrain liquid ammonia notwithstanding the fact that the aggregate area of the several passages 18 may exceed that of the supply pipe 9.

When the system is shut off momentarily, as when injection of ammonia is stopped at the end of a furrow while the vehicle is turning around, a small amount of liquid ammonia remains at the bottom of the pocket 15. Should injection be resumed before total vaporization of the liquid, the remaining liquid is immediately brought to a state of turbulence and even distribution is effected at once.

Figure 4:
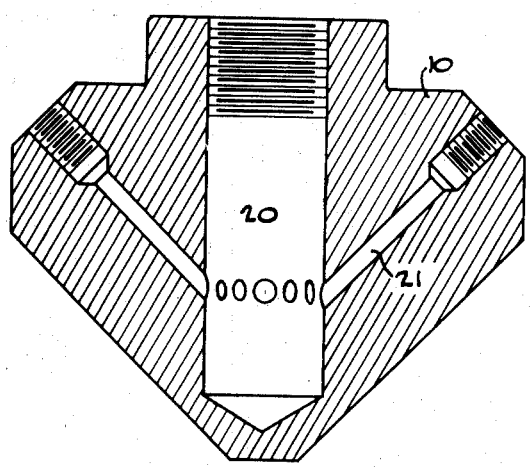
Figs. 4 and 5 are vertical cross sectional views of modified forms of the distributing head.

In the modified form shown in Fig. 4 the distributor head 10 is made of one piece of metal having a central, vertical bore 20, tapped at the top for connection to the supply pipe 9. A plurality, e. g., twelve radial and upwardly inclined outlet passages 21 are bored through the body to intercept the main bore 20 near the bottom. This head operates in the same manner as that according to Figs. 2 and 3, the bore 20 operating as a turbulence chamber. With this arrangement it is feasible to connect the restricted outlet passages 21 nearer to the bottom of the turbulence chamber because liquid therein tends to drain back into the central bore when the system is temporarily shut down.

Figure 5:
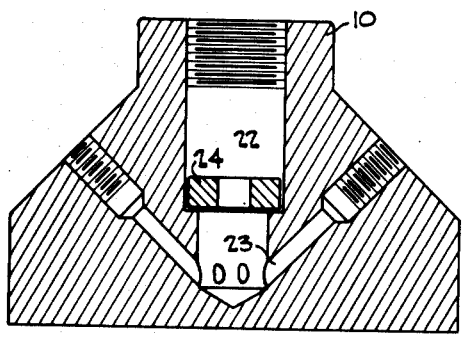
Figure 6:
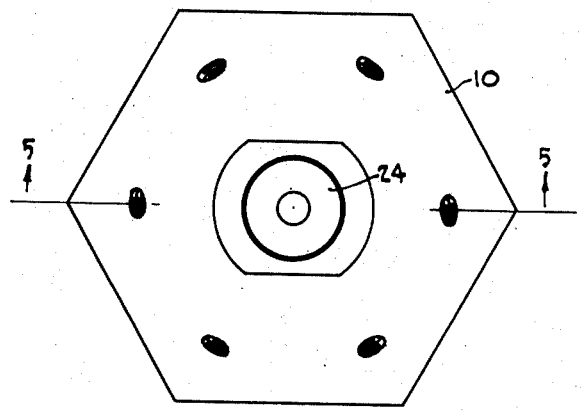
Fig. 6 is a plan view of the head shown in Fig. 5.

A further modification is shown in Fig. 5 wherein the body is also formed of one piece, and has a central bore 22, connected to six radial and upwardly inclined outlet passages 23, all bores being countersunk and tapped for threaded connections as before. The central bore 22 is of smaller diameter near its lower end, providing a shoulder on which an orifice disc 24 is positioned to reduce the cross sectional area of the inlet passage and induce a more rapid flow of ammonia into the lower portion of the bore. This lower portion constitutes the turbulence chamber, wherein turbulence is increased by the increased inlet velocity. The head, in other respects, operates as described for the previous embodiments.

I claim as my invention:

1. An applicator for agricultural use comprising a pressure cylinder for storing a volatile liquid under pressure, a supply conduit connected to said cylinder for receiving said liquid, said conduit providing a flow restriction to reduce the pressure of liquid flowing through the conduit and cause partial vaporization of said liquid, a distributor head including a casing, said casing having a substantially vertical bore connected at its upper end to said supply conduit for receiving a mixture of said liquid and the vapors therefrom and closed at the bottom, said bore defining a turbulence chamber, a plurality of lateral outlet passageways of constricted cross sectional areas in communication with said bore at points below the top of the bore extending outwardly therefrom, and separate conduit means connecting said outlet passageways to different means for injecting a mixture of said liquid and vapor into the ground.

2. In combination with the apparatus according to claim 1, a disc having a constricted orifice in the casing defining the top of said turbulence chamber, said supply conduit being connected to the distributor casing above the disc so as to cause the flow of said mixture downwardly through the orifice.

3. The apparatus according to claim 1 wherein the said outlet passageways extend upwardly and outwardly from said chamber.

4. The apparatus according to claim 1 wherein the said outlet passageways extend substantially horizontally away from said chamber.

5. In apparatus for injecting fluid into the ground at a plurality of injection points, the combination of a source of said fluid as a mixture of vapor and liquid under pressure; a supply conduit connected to receive said mixture from said source; a distributor head including a casing having a substantially vertical bore forming an upright turbulence chamber, said bore having a cross-sectional area that is small in relation to said conduit, being closed at the bottom and connected to said supply conduit substantially concentrically therewith to receive said mixture of vapor and liquid with a downward flow, and a plurality of outlet passageways of constricted cross-sectional areas in said casing communicating with said chamber below the top thereof and extending outwardly therefrom and arranged circumferentially about said bore; and a plurality of separate conduit means connecting at least a plurality of the outlet passageways to different means for injecting said fluid into the ground at said injection points.

6. The apparatus according to claim 5 wherein the outlet passageways communicate with the turbulence chamber substantially at the bottom thereof.

7. In apparatus for injecting fluid into the ground at a plurality of injection points, the combination of a source of said fluid as a mixture of vapor and liquid under pressure; a distributor head including a body member having a vertical cylindrical bore therethrough forming a turbulence chamber, a plurality of substantially radial bores of restricted cross-sectional areas in said body member forming lateral outlet passageways communicating with said chamber at an intermediate level thereof, a cover secured to the bottom of the body member closing said vertical bore, means at the top of said body member providing a constricted entrance opening situated substantially concentrically with respect to said bore and having a diameter less than that of said bore; means connecting said source to said distributor body for flow of said mixture downwardly through said entrance opening; and a plurality of separate conduit means connecting at least a plurality of the outlet passageways to different means for injecting said fluid into the ground at said injection points.

8. An ammonia applicator for agricultural use comprising a pressure cylinder for storing liquid ammonia under pressure, a supply conduit connected to said cylinder for receiving liquid ammonia, a flow control valve in said conduit, said valve being adapted to reduce the pressure of liquid ammonia flowing through the conduit and cause partial vaporization of said liquid ammonia, a distributor head including a casing, said casing having a substantially vertical bore connected at its upper end to said supply conduit and closed at the bottom, said bore defining a turbulence chamber, a plurality of lateral outlet passageways of constricted cross sectional areas in communication with said bore at points below the top of the bore extending outwardly therefrom, and separate conduit means connecting said outlet passageways to different means for injecting ammonia into the ground.

9. The ammonia applicator according to claim 8 wherein the separate conduit means comprise outlet pipes of greater cross sectional areas than said outlet passageways shaped to direct the ammonia flowing therethrough downwardly after emerging from said outlet passageways.

JAMES R. TURNER.

References Cited in the file of this patent

UNITED STATES PATENTS

| Number | Name | Date |
| --- | --- | --- |
| 1,031,885 | Stratton | July 9, 1912 |
| 2,148,413 | Labberton | Feb. 21, 1939 |
| 2,285,932 | Leavitt | June 9, 1942 |
| 2,441,204 | Nusbaum | May 11, 1948 |
| 2,461,876 | Boyle | Feb. 14, 1949 |

FOREIGN PATENTS

| Number | Country | Date |
| --- | --- | --- |
| 596,789 | France | Aug. 17, 1925 |

OTHER REFERENCES

Hackh, Chemical Dictionary, 3rd edition (1944), pp. 46, 269, 357, 532, 533.